(12) United States Patent
Wu et al.

(10) Patent No.: US 6,704,146 B2
(45) Date of Patent: Mar. 9, 2004

(54) COLLIMATING DEVICE AND METHOD FOR MAKING SAME

(75) Inventors: Kun-Tsan Wu, Tu-Chen (TW); Chih-Yi Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 3 days.

(21) Appl. No.: 10/032,310

(22) Filed: Dec. 21, 2001

(65) Prior Publication Data

US 2003/0090809 A1 May 15, 2003

(51) Int. Cl.$^7$ ................................................ G02B 27/30
(52) U.S. Cl. ........................................ 359/641; 385/93
(58) Field of Search ............................. 385/24, 33, 34, 385/49, 61, 88–94, 99, 115

(56) References Cited

U.S. PATENT DOCUMENTS 5,845,023 A * 12/1998 Lee ............................. 385/33
6,347,170 B1 * 2/2002 Zheng ......................... 385/34
6,382,841 B1 * 5/2002 Ryall ........................... 385/61

\* cited by examiner

*Primary Examiner*—Scott J. Sugarman
*Assistant Examiner*—Darryl J. Collins
(74) *Attorney, Agent, or Firm*—Wei Te Chung

(57) ABSTRACT

A collimating device (20) comprises a GRIN lens (22), a filter (24) and an outer tube (26). The GRIN lens and the filter are both secured in the outer tube. The outer tube is made of stainless steel, and has a first receiving portion (261) and a second receiving portion (262). The first receiving portion is cylindrical, and defines a cylindrical cavity (264) therein for receiving the GRIN lens. The second receiving portion is also cylindrical, and defines a generally rectangular cavity (266) therein for receiving the filter. The GRIN lens and the filter are glued in the outer tube with relatively little epoxy, and with no excess epoxy contaminating optical faces thereof.

6 Claims, 4 Drawing Sheets

COLLIMATING DEVICE AND METHOD FOR MAKING SAME

BACKGROUND OF THE INVENTION

1. Field of the Invention

The present invention relates to optical collimating devices and methods for making them, and more particularly to collimating devices that use epoxy and a tube to join components thereof.

2. Description of the Prior Art

Demand for higher transmission capacity and speed in optical communications systems is unrelenting. Optical transmission technology is constantly developing to satisfy such demand. Dense Wavelength Division Multiplexing (DWDM) technology has been an important development, and is now in widespread use in optical communications systems throughout the world. A DWDM system multiplexes a plurality of signals of different wavelengths into a single optical fiber at an initiating end of the optical fiber. The multiplexed signals are then demultiplexed into a plurality of signals at a terminal end of the optical fiber. Each demultiplexed signal is then output to an end recipient. DWDM systems can increase optical transmission capacity by up to ten times or even more.

A collimating device incorporating a filter is a basic wave division device deployed in many optical modules used in DWDM systems, such as Optical Add-Drop Multiplexers (OADMs) and Dense Wavelength Division Multiplexers (DWDMs). FIG. 1 shows a conventional collimating device 10 comprising a Graded Index (GRIN) lens 12 and a filter 14. Typically, the filter 14 is adhered on an end face (not labeled) of the GRIN lens 12 using two types of epoxy. One type is UV Epoxy 16, and the other type is 353 NDT Epoxy 18. UV Epoxy 16 has less fluidity and viscosity than 353 NDT Epoxy 18. In assembly, UV Epoxy 16 is first applied at an interface (not labeled) between the GRIN lens 12 and the filter 14. A UV gun temporarily cures the UV Epoxy 16. This process sometimes results in contamination of the corresponding end faces of the GRIN lens 12 and the filter 14. Such contamination reduces optical performance of the collimating device 10. Then the 353 NDT Epoxy 18 is applied around an outer surface of the UV Epoxy 16. A relatively large amount of 353 NTD Epoxy 18 is required to cover the entire expanse of the interface. The collimating device 10 is baked to permanently cure the 353 NTD Epoxy 18 and the UV Epoxy 16. The GRIN lens 12 and filter 14 are thus fastened to each other.

Coefficients of thermal expansion of UV Epoxy 16 and 353 NTD Epoxy 18 are respectively $4.3 \times 10^{-5}/^\circ$ C. and $4.7 \times 10^{-5}/^\circ$ C., both of which are several times greater than coefficients of thermal expansion of the GRIN lens 12 and the filter 14. Therefore, baking can result in asymmetric thermal stress. As a result, optical characteristics of the collimating device 10 may vary according to the prevailing operating temperature of the collimating device 10 at any given time. Unstable operation of the collimating device 10 adversely affects signal transmission. Moreover, the procedure for obtaining precise alignment and positioning of the filter 14 relative to the GRIN lens 12 is complicated. This increases production costs.

An improved collimator device is needed to overcome the many disadvantages of conventional collimating devices.

SUMMARY OF THE INVENTION

Accordingly, an object of the present invention is to provide an inexpensive collimating device having low insertion loss.

Another object of the present invention is to provide a collimating device free from contamination caused by excess glue.

A further object of the present invention is to provide a collimating device which allows easy and precise adjustment of components thereof.

To achieve the objects set out above, a collimating device of the present invention comprises a GRIN lens, a filter and an outer tube. The GRIN lens and the filter are both secured in the outer tube. The outer tube is made of stainless steel, and has a first receiving portion and a second receiving portion. The first receiving portion is cylindrical, and defines a cylindrical cavity therein for receiving the GRIN lens. The second receiving portion is also cylindrical, and defines a generally rectangular cavity therein for receiving the filter. The GRIN lens and the filter are glued in the outer tube with relatively little epoxy, and with no excess epoxy contaminating optical faces thereof.

Other objects, advantages and novel features of the present invention will be apparent from the following detailed description of a preferred embodiment thereof with reference to the attached drawings, in which:

DETAILED DESCRIPTION OF THE PREFERRED EMBODIMENT

Figure 1:
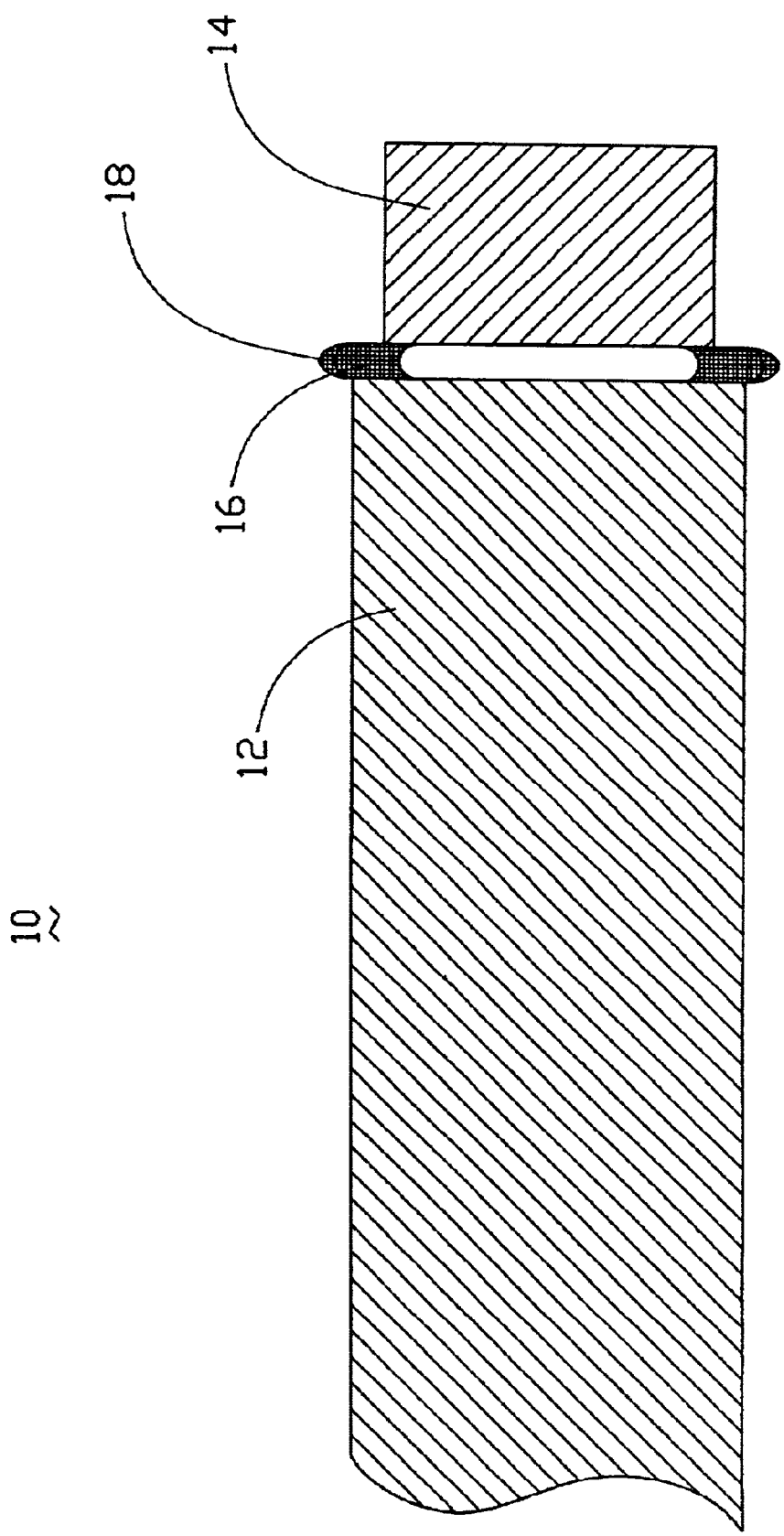
FIG. 1 is a schematic cross-sectional view of a conventional collimating device.

Reference will now be made to the drawing figures to describe the present invention in detail.

Figure 2:
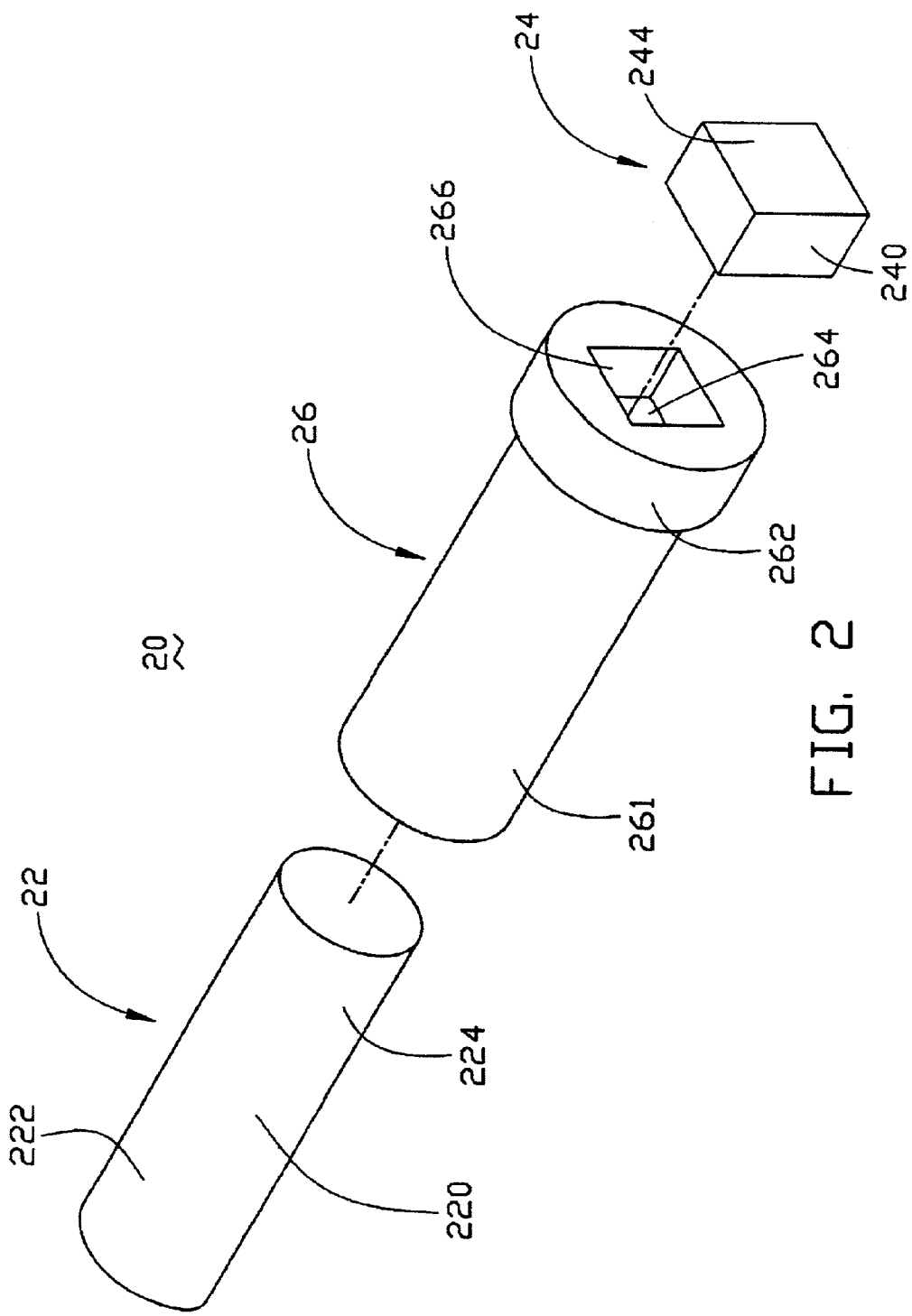
FIG. 2 is an exploded perspective view of a collimating device in accordance with the present invention.

Referring to FIG. 2, an optical collimating device 20 in accordance with a preferred embodiment of the present invention comprises a Graded Index (GRIN) lens 22, a filter 24 and an outer tube 26. The GRIN lens 22 and the filter 24 are both secured in the outer tube 26.

The GRIN lens 22 is cylindrical, and includes a cylindrical outer surface 220, a first end 222 and a second end 224. The first end 222 terminates at a first end face (not labeled). The first end face is obliquely ground and polished so that it forms an angle with an imaginary line that is perpendicular to a longitudinal axis of the GRIN lens 22. The angle is typically 6 to 8 degrees. The second end 224 has a second end face (not labeled) perpendicular to the longitudinal axis of the GRIN lens 22. A pitch of the GRIN lens 22 is equal to or slightly less than one-quarter pitch, so that light passing through the GRIN lens 22 can be focused at a point on an end face of a corresponding optical fiber (not shown).

The filter 24 typically is a thin film filter transmitting only one particular wavelength signal and reflecting all the other wavelength signals. The filter 24 is generally box-shaped, and has four peripheral walls 240, an inside surface 242 (see FIG. 3) and an outside surface 244. The inside surface 242 and the outside surface 244 are slightly curved (curvatures not shown).

The outer tube 26 has a first receiving portion 261 and a second receiving portion 262. An outer diameter of the second receiving portion 262 is greater than an outer diameter of the first receiving portion 261. The first receiving portion 261 is cylindrical, and defines a cylindrical cavity 264 therein. A diameter of the cylindrical cavity 264 is slightly greater than a diameter of the GRIN lens 22. A length of the first receiving portion 261 is less than a length of the GRIN lens 22. The second receiving portion 262 is also cylindrical, and defines a generally rectangular cavity 266 therein. A length of the second receiving portion 262 is equal to a corresponding length of the filter 24. Accordingly, a corresponding length of the rectangular cavity 266 is equal to the corresponding length of the filter 24. Other dimensions of the rectangular cavity 266 are slightly greater than corresponding dimensions of the filter 24.

Figure 3:
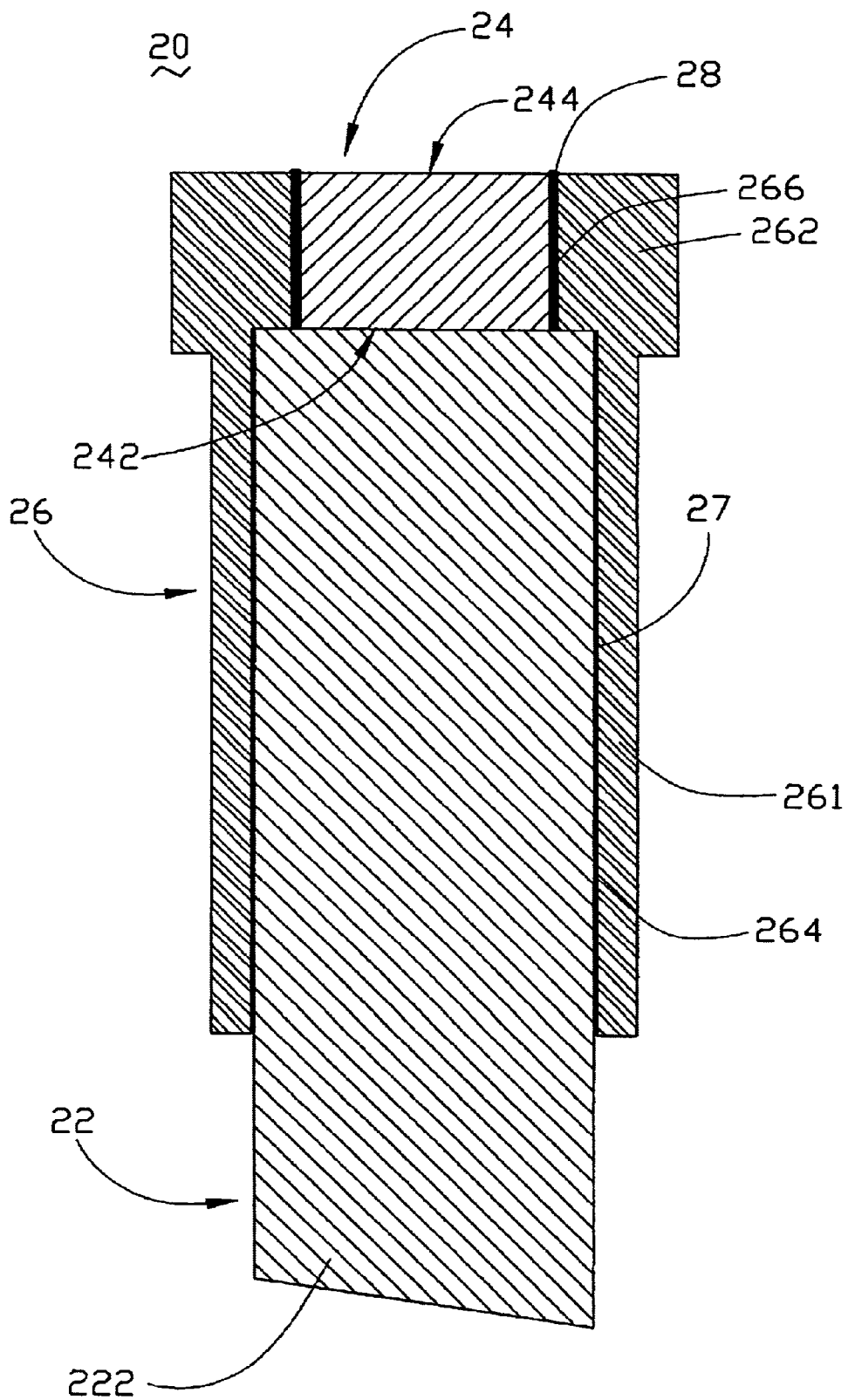
FIG. 3 is a schematic cross-sectional view of the collimating device of FIG. 2 fully assembled.
Figure 4:
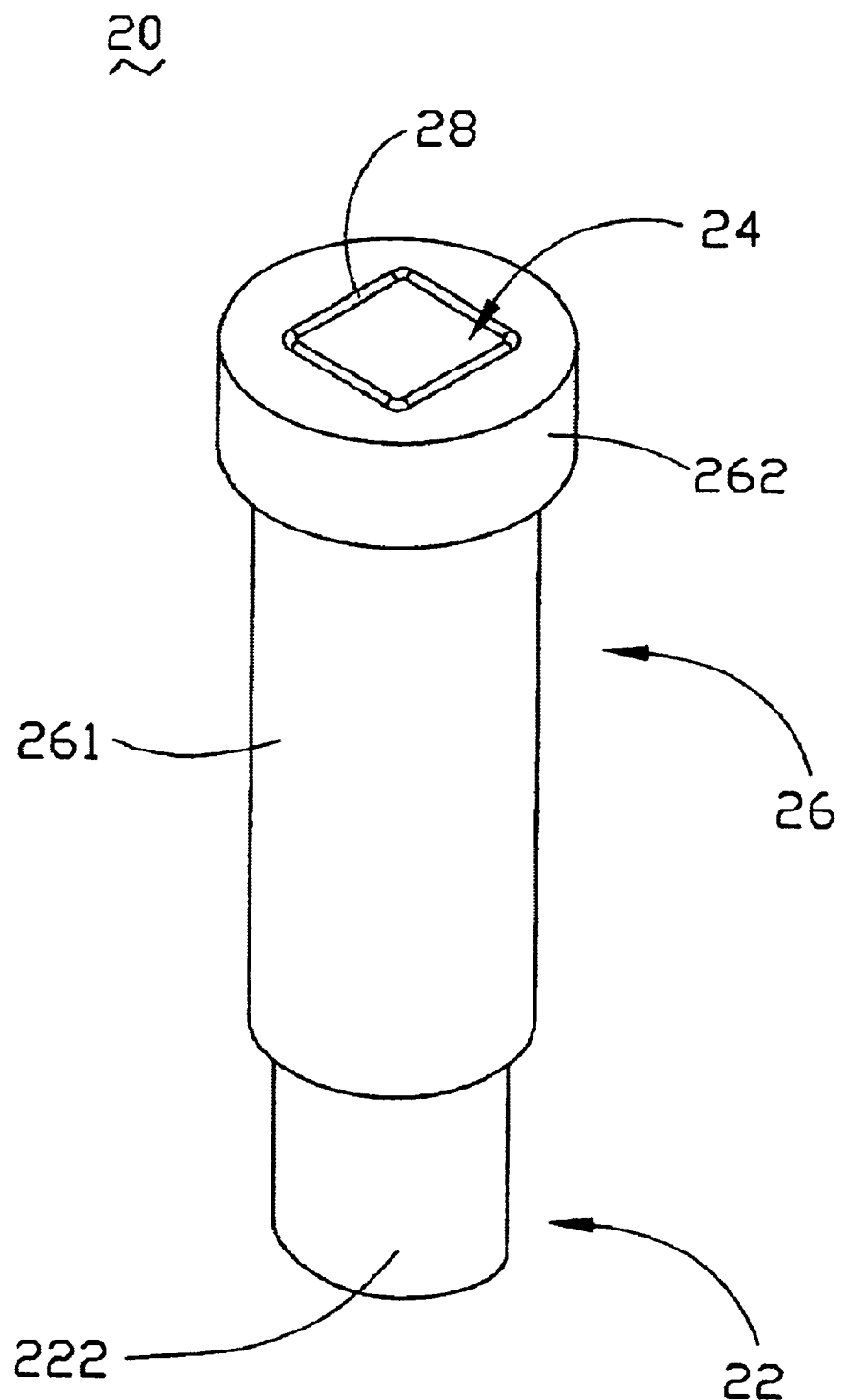
FIG. 4 is a perspective view of the collimating device of FIG. 2 fully assembled.

Referring to FIGS. 3 and 4, in assembly, a contact portion (not labeled) of the cylindrical outer surface 220 of the GRIN lens 22 is uniformly coated with a thin epoxy film 27. In the preferred embodiment, the epoxy in the thin epoxy film 27 is 353 NDT Epoxy. The contact portion of the GRIN lens 22 is then fully inserted into the first receiving portion 261 of the outer tube 26. The first end 222 of the GRIN lens 22 remains outside the first receiving portion 261. The combined outer tube 26 and GRIN lens 22 is baked for half an hour at 85° C., and then baked for half an hour at 110° C. This cures the thin epoxy film 27, and firmly secures the GRIN lens 22 in the first receiving portion 261.

The outer tube 26 is then held in a vertical orientation, with the second receiving portion 262 above the first receiving portion 261. The filter 24 is inserted into the rectangular cavity 266 of the second receiving portion 262. A position of the inside surface 242 of the filter 24 is adjusted to optically correspond to and contact a middle portion of the second end face of the GRIN lens 22. Epoxy is applied between the peripheral walls 244 of the filter 24 and corresponding inner surfaces (not labeled) of the second receiving portion 262. In the preferred embodiment, the epoxy is UV Epoxy 28. The UV Epoxy 28 is immediately pre-cured by ultraviolet irradiation, and then baked for two hours at 85° C. to attain permanent curing. Alternatively, 353 NDT Epoxy can be used instead of UV Epoxy 28. The 353 NDT Epoxy is baked for half an hour at 85° C., and then baked for half an hour at 110° C. to attain final curing. The filter 24 is securely fastened in the rectangular cavity 266. The collimating device 20 is thus formed.

In the collimating device 20, no excess glue contaminates the first or second end faces of the GRIN lens 22 or the inside or outside surfaces 242, 244 of the filter 24. Insertion loss of the collimating device 20 is minimized. In addition, by precision building the outer tube 26, precise alignment and positioning of the GRIN lens 22 relative to the filter 24 can be easily attained. Furthermore, using a minimal amount of epoxy limits the amount of any thermal strain that may result from baking. Relatively small thermal strain seldom affects optical characteristics of the collimating device 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What claimed is:

1. A collimating device comprising:
    a Graded Index lens;
    a filter; and
    a tube comprising a first receiving portion and a second receiving portion, wherein the Graded Index lens is secured in the first receiving portion, and the filter is secured in the second receiving portion, a length of the first receiving portion is less than a length of the Graded Index lens and a length of the second receiving portion is equal to a corresponding length of the filter.

2. The collimating device as described in claim 1, wherein the first receiving portion defines a cylindrical cavity therein, and the second receiving portion defines a generally rectangular cavity therein.

3. The collimating device as described in claim 2, wherein the Graded Index lens is secured in the cylindrical cavity, and the filter is secured in the rectangular cavity.

4. The collimating device as described in claim 3, wherein a length of the rectangular cavity is equal to a length of the filter.

5. The collimating device as described in claim 1, wherein the Graded Index lens has an inner end face contacting an inside surface of the filter.

6. The collimating device as described in claim 1, wherein the Graded Index lens has an obliquely ground and polished end disposed outside the first receiving portion of the tube.

* * * * *